8250X
J. C. Kempton.
Loom.
Patented Jun. 14, 1834.
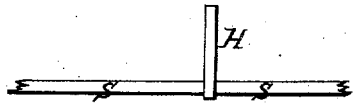
Fig. 1
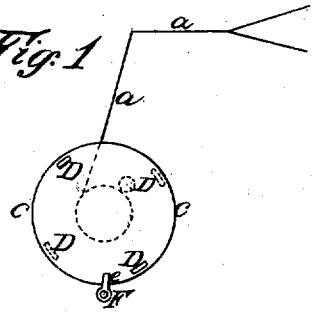
Fig. 2.
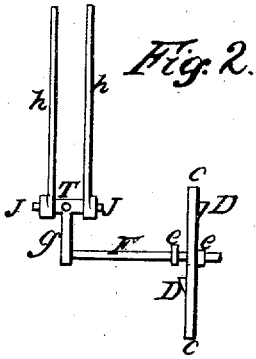
Fig. 3.
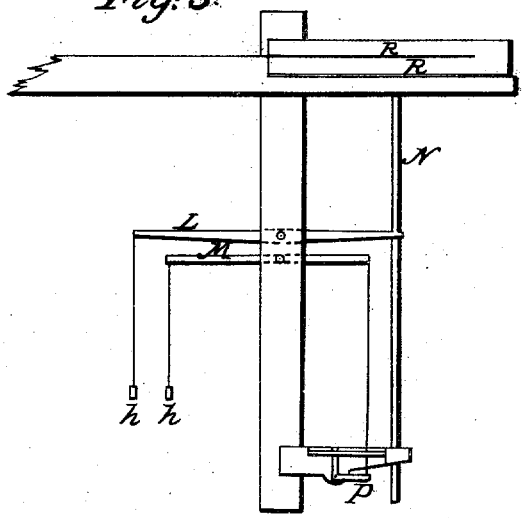
N. PETERS, PHOTO-LITHOGRAPHER, WASHINGTON, D. C.

June 14. 1834 105

James C. Kempton. Mannayunk. Penn.

Letters Patent

8250X

The Schedule referred to in these Letters Patent and making part of the same con-
-taining a description in the words of the said James C. Kempton himself of his
improvement in the Power Loom To all to whom it may Concern Be it known that I James C. Kempton of
Mannayunk, in the County of Philadelphia and State of Pennsylvania have
invented an improvement in the power Loom which improvement is intended
to be applied to the weaving of Checks and Cross bars and I do hereby declare that
the following is a full and exact description thereof In the ordinary mode of weaving Checks
and Cross bars by power looms, the width of a stripe of any particular Color is gov-
-erned by the number of throws of the Shuttle, and should the weft run out or break
previous to completing the stripe the shuttle still continues in motion until
having performed the requisite number of throws the box changes, and this brings
into action another Shuttle containing a different Color and thereby produces an
irregular stripe By my improvement the change of boxes is independent of the
number of throws of Shuttle being governed by the width of stripe actually woven
which I effect in the following manner, a a Fig 1 represents the Cloth passing as
woven around the cloth beam B, C C, is a pattern wheel on end of Cloth beam and
revolving with it D.D.D. are small cams set at requisite distances on either side of
wheel C.C. by the revolving of pattern wheel, these small cams act on the projecting
pins E.E, fig 2. which gives the rod F a slight reciprocating motion g. is a short
arm projecting from the stand I.I, and attached by a movable joint to rod F h.
h. are levers moving vertically on their fulcrums I.I. and horizontally on their
fulcrum I. k. is an arm projecting from revolving shaft S.S. the reciprocating
motion of F brings the levers h.h. in succession under the arm k, by which they
receive a vertical movement the depression of one being attached to lever L, Fig 3.
forces up the rod N and with it boxes R.R the depression of one connected with
the lever M, acts on the knee piece P and by withdrawing a catch from rod O.

[illegible]

8250X allows the boxes to fall. The rotation of Cloth beam is effected in the usual man-
-ner by means of ratchet and weight which causes it to revolve only as the weft
is woven in of course should the weft break or run out, the beam and with it the
pattern wheel remains quiet and thus the boxes remain unchanged however
frequent the Shuttle may be thrown.

What I claim as my invention is the meth-
-od herein described of changing the boxes independent of the number of throws
of Shuttle by means of the Stripe actually woven and this I claim whether the
same is effected precisely in the manner set forth or in any other operating
on the same principle and producing the same effect

Witnesses
Exd. Moses Hempton }
H.G. Samuel Borden } James C. Hempton

Drawing 624 wds